US012658127B2

(12) United States Patent
Suzuki et al.

(10) Patent No.: US 12,658,127 B2
(45) Date of Patent: Jun. 16, 2026

(54) HDR OLED DISPLAY POWER CONTROL

(71) Applicant: Microsoft Technology Licensing, LLC, Redmond, WA (US)

(72) Inventors: Nobuyuki Suzuki, Kirkland, WA (US); Baek Woon Lee, Bellevue, WA (US); Ying Zheng, Sammamish, WA (US); Samu Matias Kallio, Redmond, WA (US); Kari Jussi Ropo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

(21) Appl. No.: 18/661,376

(22) Filed: May 10, 2024

(65) Prior Publication Data

US 2024/0296795 A1 Sep. 5, 2024

Related U.S. Application Data

(63) Continuation of application No. 17/815,480, filed on Jul. 27, 2022, now Pat. No. 12,008,958.

(51) Int. Cl.
*G09G 3/3233* (2016.01)

(52) U.S. Cl.
CPC ... *G09G 3/3233* (2013.01); *G09G 2300/0828* (2013.01); *G09G 2300/0842* (2013.01); *G09G 2310/0286* (2013.01); *G09G 2310/0289* (2013.01); *G09G 2310/0294* (2013.01); *G09G 2310/08* (2013.01); *G09G 2320/0626* (2013.01); *G09G 2330/021* (2013.01); *G09G 2330/028* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 2018/0122058 A1* | 5/2018 | Kang | ...................... | G06T 7/136 |
| 2019/0295504 A1* | 9/2019 | Xiong | ...................... | G09G 5/10 |
| 2019/0325828 A1* | 10/2019 | Zhang | .................. | G09G 3/3225 |
| 2021/0118349 A1* | 4/2021 | Choi | ..................... | G06F 3/0446 |
| 2023/0260466 A1* | 8/2023 | Jiang | ........................ | G09G 5/10 345/204 |

* cited by examiner

*Primary Examiner* — Matthew Yeung
(74) *Attorney, Agent, or Firm* — Alleman Hall LLP

(57) ABSTRACT

An organic light emitting diode (OLED) display system comprises an OLED array and a power management system that includes at least one voltage generator for the OLED array. A timing microcontroller comprises a decoder/encoder configured to receive HDR pixel data and output display pixel data. A portion of the HDR pixel data is sampled and a luminance index value of the sampled portion is determined, where the luminance index value corresponds to a maximum luminance of the sampled portion. The luminance index value is used to control the at least one voltage generator to reduce power consumption of the OLED display system.

20 Claims, 9 Drawing Sheets

HDR OLED DISPLAY POWER CONTROL

CROSS REFERENCE TO RELATED APPLICATIONS

This application is a continuation of U.S. patent application Ser. No. 17/815,480, filed Jul. 27, 2022, the entirety of which is hereby incorporated herein by reference for all purposes.

BACKGROUND

Organic Light Emitting Diode (OLED) displays utilize arrays of OLEDs that emit light when electricity is conducted through them. OLED displays that reproduce high dynamic range (HDR) data can display images with greater brightness and dynamic range as compared to standard dynamic range (SDR) data.

SUMMARY

According to one aspect of the present disclosure, an organic light emitting diode (OLED) display system is configured to reproduce high dynamic range (HDR) video via an OLED array in a manner that reduces power consumption. The OLED display system comprises an OLED array of OLED pixels and a power management system configured to provide power to the OLED pixels. The power management system includes at least one voltage generator that generates OLED voltages for OLED emission in the OLED array. A timing microcontroller comprises a decoder/encoder configured to receive HDR pixel data and output display pixel data. A memory stores instructions executable by the timing microcontroller to sample a sampled portion of the HDR pixel data and determine a luminance index value of the sampled portion of the HDR pixel data, wherein the luminance index value corresponds to a maximum luminance of the sampled portion of the HDR pixel data. The luminance index value is used to control the at least one voltage generator.

Another aspect provides, at an organic light emitting diode (OLED) display system configured to reproduce high dynamic range (HDR) video via an OLED array, a method for reducing power consumption of the OLED display system, method comprising: receiving HDR pixel data from an HDR data source; sampling a sampled portion of the HDR pixel data; determining a luminance index value of the sampled portion of the HDR pixel data, wherein the luminance index value corresponds to a maximum luminance of the sampled portion of the HDR pixel data; and using the luminance index value to control at least one voltage generator that generates OLED voltages for OLED emission in the OLED array.

Another aspect provides a computing device comprising an organic light emitting diode (OLED) display system having a default maximum luminance capability, the OLED display system configured to reproduce high dynamic range (HDR) video. The OLED display system comprises an OLED array of OLED pixels and a power management system configured to provide power to the OLED pixels, with the power management system comprising at least one voltage generator that generates OLED voltages for OLED emission in the OLED array.

A timing microcontroller comprises a decoder/encoder configured to receive HDR pixel data and output display pixel data. A memory stores instructions executable by the timing microcontroller to sample a sampled portion of the HDR pixel data, and to determine a luminance index value of the sampled portion of the HDR pixel data, wherein the luminance index value corresponds to a maximum luminance of the sampled portion of the HDR pixel data. The luminance index value is used to control the at least one voltage generator in a manner that dynamically adjusts the default maximum luminance capability to a runtime maximum luminance capability that is lower than the default maximum luminance capability.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
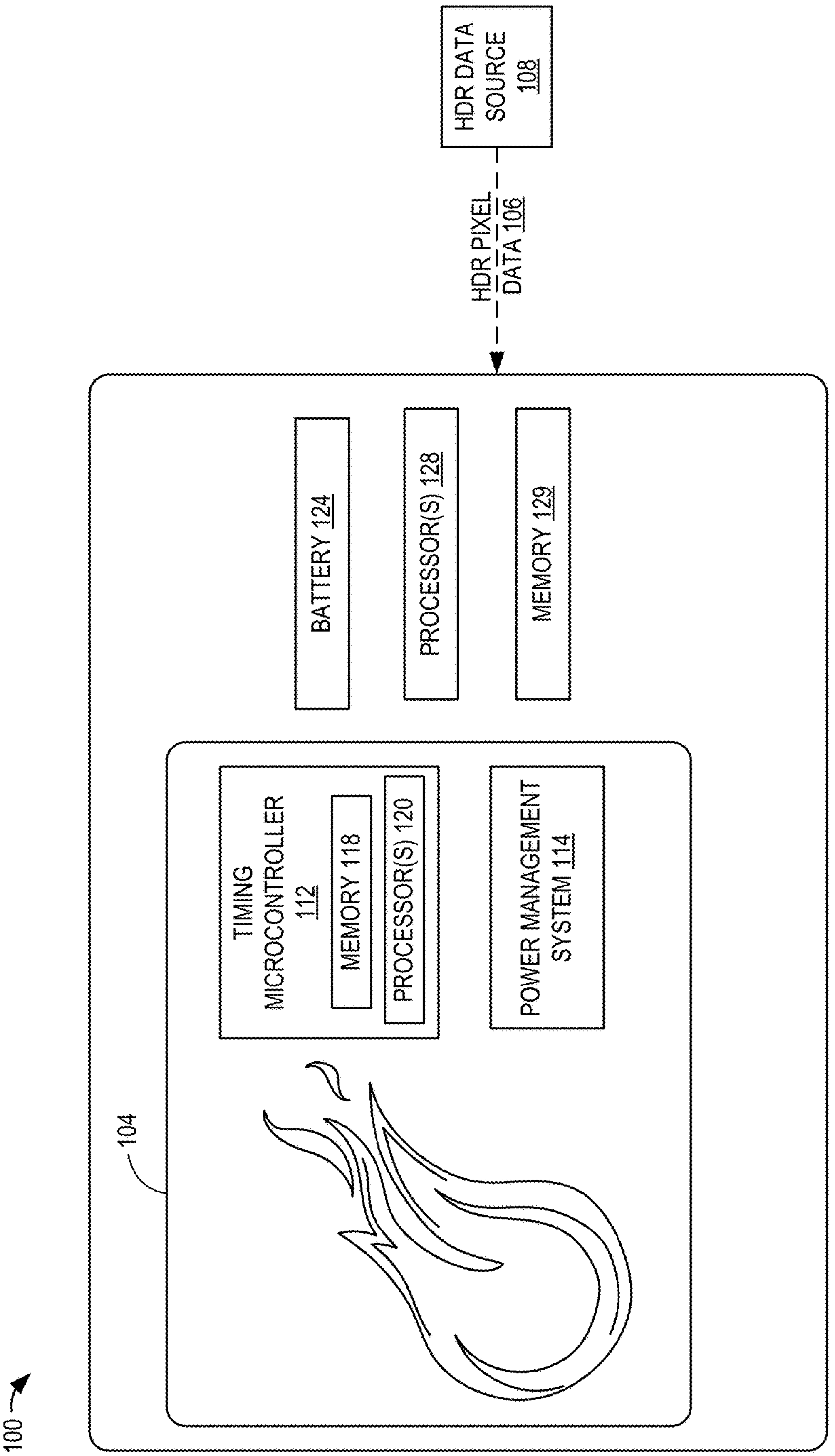
FIG. 1 shows an example of a computing device comprising an organic light emitting diode (OLED) display system configured to reduce power consumption according to examples of the present disclosure.

Organic Light Emitting Diode (OLED) display devices are generally configured with a peak brightness default value or setting that represents the peak brightness capability of the device. With many OLED display devices, an external source such as a graphics controller or an image data source device provides a reference brightness level to the display. In some examples an OLED display device can use this externally-provided reference level to control its default peak brightness settings.

OLED displays that reproduce high dynamic range (HDR) data can display images with greater brightness and dynamic range as compared to standard dynamic range (SDR) data. For example, some HDR OLED displays can achieve a peak brightness of between approximately 500 nits and 1000 nits. HDR data received by such displays includes luminance information. Accordingly, reference brightness levels are generally not provided by external devices to HDR reproduction systems. Instead, upon beginning HDR reproduction, OLED displays generally set their reference brightness level to the highest luminance capability of the device to ensure that it can reproduce the brightest elements of the content it will receive.

In many examples, only portions of the HDR data received by the OLED display will require the display to utilize its highest luminance capability. For example, a two-hour HDR video can contain a cumulative total of one minute of scenes requiring a luminance of 800 nits or above, while the remaining content of the video may average just 100 or 200 nits. However, to maintain the capability of displaying a peak luminance of 800 nits or greater when required, many OLED display devices continuously consume significant power, even when the display is actually displaying much dimmer content, such as 100 or 200 nits. Accordingly, significant power is dissipated in one or more parasitic circuits of the OLED pixels. Such dissipated power unnecessarily consumes power resources. Further, this power usage can negatively impact battery life in portable and other devices that rely on rechargeable power supplies.

To address one or more of these issues, examples are disclosed that relate to OLED display devices and related methods and circuits for reducing voltage levels used for OLED emission in reproducing HDR video content. Advantageously and as described in more detail below, examples of the present disclosure sample incoming HDR data at runtime to determine a luminance index value of the sampled portion. This value is then utilized to control one or more voltage generators in a manner that dynamically adjusts the default maximum luminance capability of the OLED device to a runtime maximum luminance capability that is lower than the default maximum luminance capability. In this manner and as described further below, power consumption of a parasitic circuit at each OLED node is significantly reduced, while the device's peak brightness capabilities are still available and can be utilized as needed. Additionally, configurations of the present disclosure dynamically change the dynamic range of OLED displays, thereby increasing gray levels and suppressing digital artifacts in dark images.

With reference now to FIG. 1, an example computing device 100 that includes an OLED display system 104 according to the present disclosure is provided. In some examples, the computing device 100 comprises a tablet computing device, smartphone, wearable computing device, or other portable computing device. In other examples, OLED display systems of the present disclosure may be utilized in a variety of other devices, including but not limited to monitors, televisions, and automotive displays. As described further below, the OLED display system 104 receives HDR pixel data 106 from an external HDR data source 108, such as a streaming service.

In the present example and as described further below, the OLED display system 104 of computing device 100 includes a timing microcontroller 112 and a power management system 114. The timing microcontroller 112 includes memory 118 and one or more processors 120 for storing and executing instructions to control one or more voltage generators of the power management system 114 in a manner that optimizes and reduces power consumption of the OLED display system 104 when displaying HDR content.

In this example, the computing device 100 includes a battery 124 that stores and provides power to the OLED display system 104. One or more processors 128 serve as a platform for executing an operating system and other software stored in memory 129 of the computing device 100. Additional aspects of the computing device 100 and timing microcontroller 112 are described in more detail below with reference to FIG. 8. It will also be appreciated that the foregoing example is presented for exemplary purposes only, and that a variety of other computing device configurations and architectures can utilize OLED display systems that utilize the principles of the present disclosure.

Figure 2:
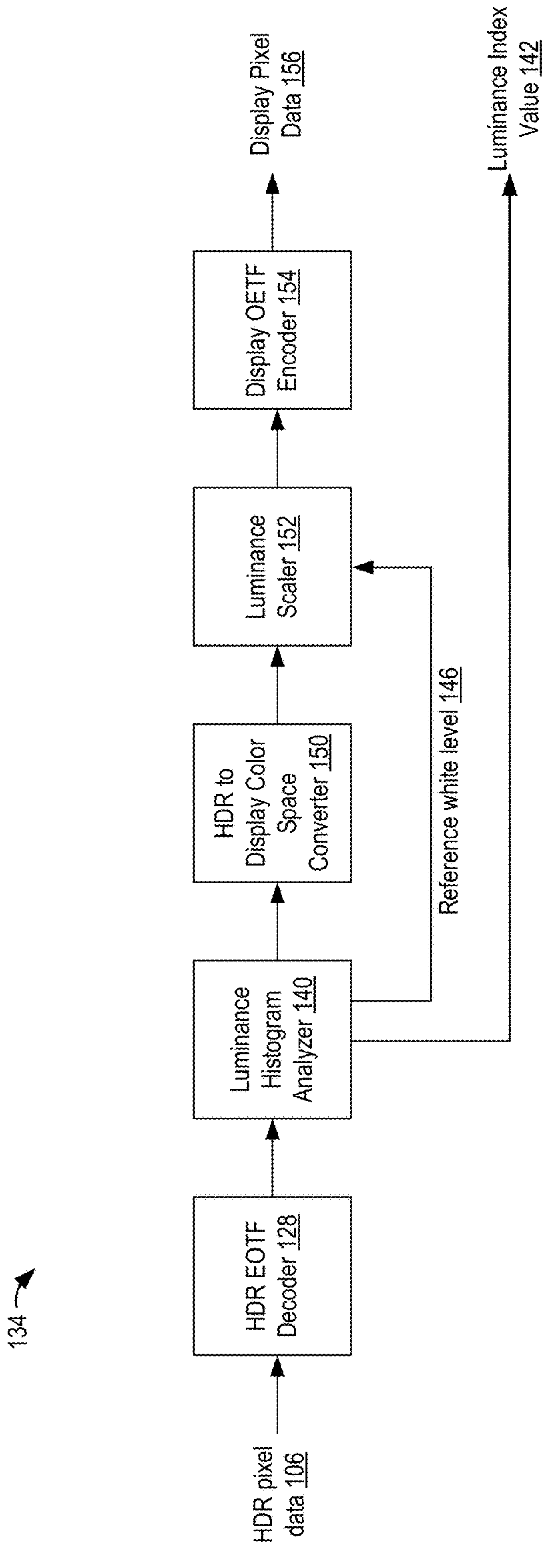
FIG. 2 shows a schematic diagram of a logical data flow for an HDR pixel data to display pixel data decoder/converter of the OLED display system according to examples of the present disclosure.

With reference now to FIG. 2, the timing microcontroller 112 includes an HDR pixel data to display pixel data decoder/encoder 134. As described in more detail below, and in one potential advantage of the present disclosure, the HDR pixel data to display pixel data decoder/encoder 134 includes a luminance histogram analyzer 140 that generates a luminance histogram of sampled portions of the HDR pixel data 106, and determines a luminance index value 142 from the luminance histogram. Advantageously, and as described further below, by dynamically determining a luminance index value at runtime for each sampled portion of HDR pixel data, configurations of the present disclosure can utilize this real time luminance data to reduce power consumption of the OLED display system 104.

The HDR pixel data to display pixel data decoder/encoder 134 includes an HDR Electro-Optical Transfer Function (EOTF) decoder that transfers the electronic signal of the HDR pixel data 106 into an optical signal to linearize the HDR pixel data. Linearized HDR pixel data represents luminance data as well as color chromaticity data in a linear scale. Portions of the linearized HDR pixel data are then sampled by the luminance histogram analyzer 140 over a sampling window (e.g., sampling rate). In one example, a sampled portion of the HDR pixel data corresponds to a sampling of one frame of HDR pixel data. In other examples, other sampling windows can be utilized. For example, sampled portions of the HDR pixel data may be captured over sampling windows of between one frame and 240 frames of the HDR pixel data. In some examples, HDR pixel data from multiple frames of a sampling window are averaged to generate an average HDR pixel data for the sampling window.

Using the sampled portion of the HDR pixel data 106, the luminance histogram analyzer 140 generates a luminance histogram of the sampled portion. Using this luminance histogram, the luminance histogram analyzer 140 determines a reference white level 146 (e.g., maximum luminance level) for the sampled portion of HDR pixel data. Additionally, and as described in more detail below, the luminance histogram analyzer 140 converts the reference white level 146 to a luminance index value 142, which represents a domestic relative luminance value for the particular OLED display system 104. Advantageously and as described further below, the luminance index value 142 is propagated to one or more voltage generators that utilize this value to dynamically adjust a maximum luminance capability of the OLED display system 104 and thereby reduce power consumption of the display system.

Once a luminance histogram has been generated, an HDR to Display Color Space Converter 150 converts the linearized HDR pixel data to display pixel data via a color transform matrix. In different examples, the color transform matrix can be a 3×3 matrix, a 3-dimensional Look-Up-Table, or other configuration. The linearized display pixel data is then scaled by a luminance scaler 152 utilizing the reference white level 146. In some examples, the reference white level 146 extracted by the luminance histogram analyzer 140 can be utilized by the luminance scaler 152 to dynamically change the dynamic range of the OLED display system 104 and increase available gray levels. For example, the reference white level 146 can be utilized to increase the number of gray levels used to display dark portions of content and to suppress digital artifacts in dark images. Once the linearized display pixel data is scaled by luminance scaler 152, the scaled linearized display pixel data is then coded back to non-linear display pixel data 156 by a Display Opto-Electric Transfer Function (OETF) 154.

Figure 3:
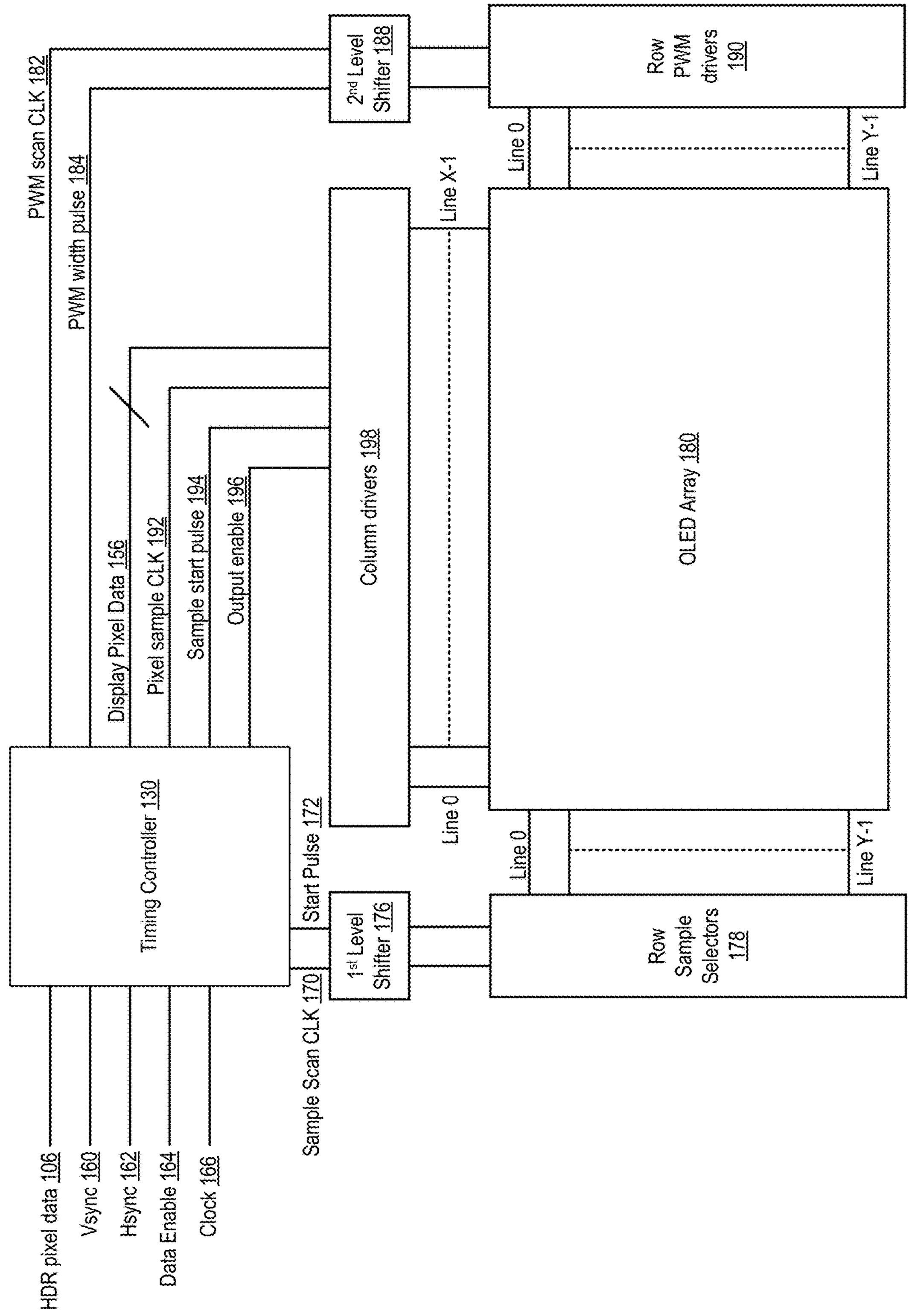
FIG. 3 shows a schematic diagram of a logical signal architecture that may be utilized by OLED display systems according to examples of the present disclosure.

With reference now to FIG. 3, a schematic diagram of an example logical signal architecture that may be utilized by OLED display system 104 will now be described. As noted above, timing microcontroller 130 includes the HDR pixel data to display pixel data decoder/encoder 134 described above. In this example, the timing microcontroller 130 receives multiple inputs, including the HDR pixel data 106, a vertical synchronization signal 160, a horizontal synchronization signal 162, a data enable signal 164, and a clock signal 166. In different examples, these signals are encoded by various high-speed differential signal standards, such as a Display Port (DP) signal, embedded DP signal, High-Definition Media Interface (HDMI) signal, or Display Serial Interface (DSI) signal.

The timing microcontroller 130 outputs the nonlinear display pixel data 156 generated by the HDR pixel data to display pixel data decoder/encoder 134. The timing microcontroller 130 also outputs a variety of other signals, including sample line selector (scan) clock 170 and its shift register start pulse 172 to a first level shifter 176 that is communicatively coupled to row sample selectors 178 for the OLED array 180 of the OLED display system 104. The timing microcontroller 130 also outputs a Pulse Width Modulation (PWM) scan clock 182 signal and its PWM width pulse 184 to a second level shifter 188 that is communicatively coupled to row PWM drivers 190 for the OLED array 180. The timing microcontroller 130 also outputs pixel sample clock 192, pixel sample start pulse 194, and column driver output enable 196 signals to the column drivers 198. Additionally, and as indicated in FIG. 3, the OLED array 180 comprises a plurality of OLEDs arranged in X columns (from Line 0 to Line X−1) and Y rows (from Line 0 to Line Y−1).

Figure 4:
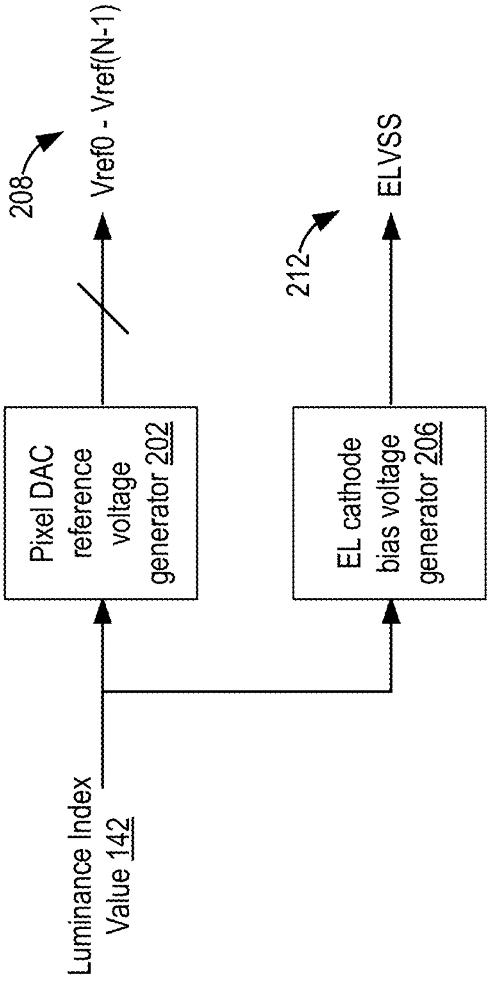
FIG. 4 shows a schematic diagram of two voltage converters that may be utilized by OLED display systems according to examples of the present disclosure.

As noted above and in different examples, the luminance index value 142 generated by the luminance histogram analyzer 140 of the timing microcontroller 130 is utilized to control one or more voltage generators of the OLED display system 104. With reference now to FIG. 4, in one example the luminance index value 142 generated by the luminance histogram analyzer 140 of the timing microcontroller 130 is provided to and utilized by two voltage converters for each OLED node in the OLED array 180. More particularly, in this example the luminance index value 142 is provided to a pixel DAC reference voltage generator 202 and to an electroluminescent (EL) cathode bias voltage generator 206 for each OLED node. In the present example and with reference now to FIG. 5 and described further below, the pixel DAC reference voltage generators 202 and EL cathode bias voltage generators 206 are located in a power management integrated circuit 210 of a power management system that distributes power to the OLED array 180.

Figure 5:
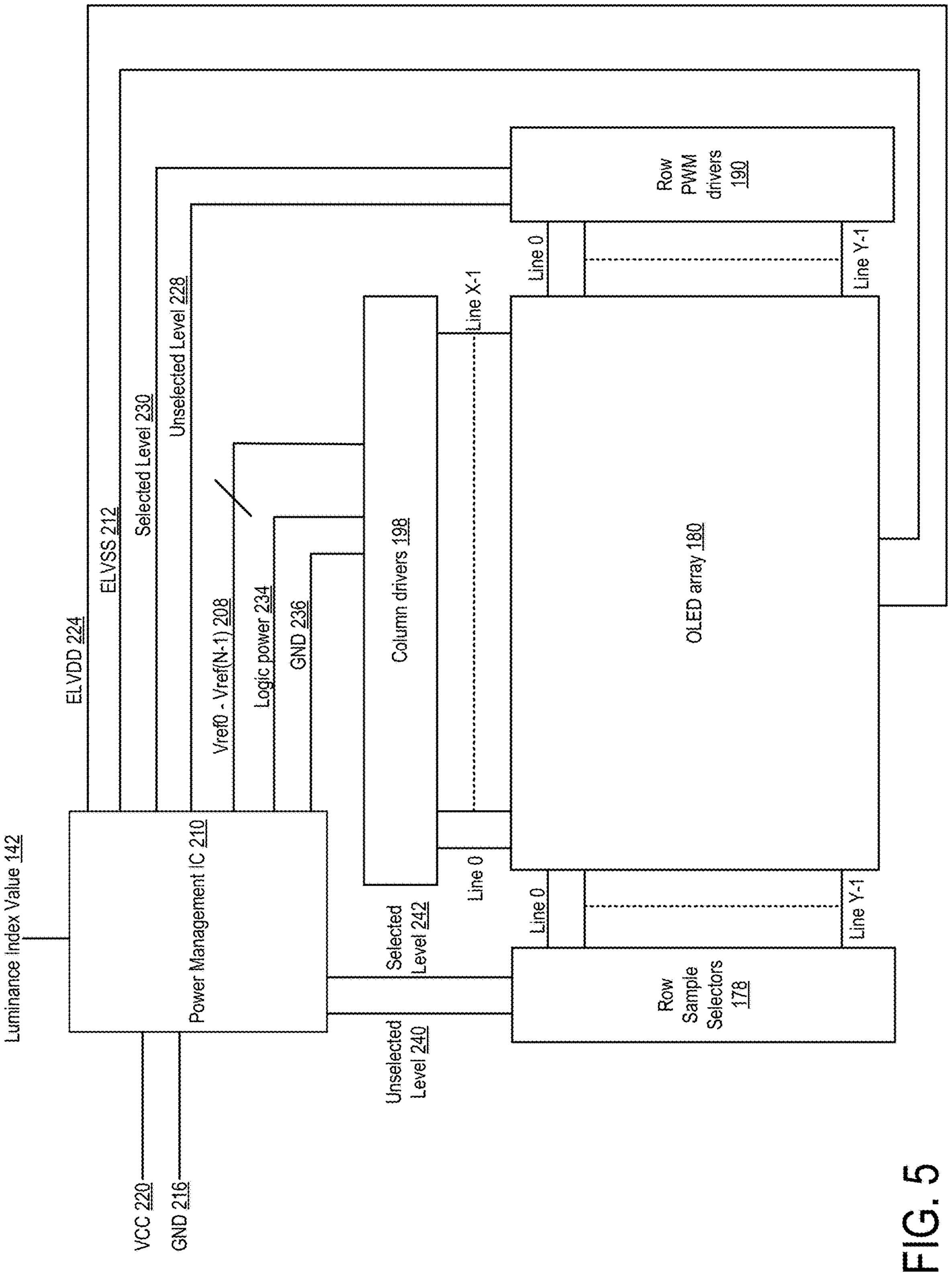
FIG. 5 shows a schematic diagram of an example power supply architecture that includes the voltage converters of FIG. 3 and can be utilized by OLED display systems according to examples of the present disclosure.

With reference again to FIG. 4, the pixel DAC reference voltage generator 202 uses the luminance index value 142 to generate a pixel DAC reference voltage Vref 208 for the column drivers 198 of the OLED array 180 (see also FIG. 5). In the present example, the pixel DAC reference voltage generator 202 uses the luminance index value 142 to select the pixel DAC reference voltage Vref 208 from a first pre-set look up table (LUT) of pixel DAC reference voltages.

In a similar manner, the EL cathode bias voltage generator 206 uses the luminance index value 142 to generate an EL cathode bias voltage ELVSS 212 for the cathode side of the OLED node (see also FIG. 5). In the present example, the EL cathode bias voltage generator 206 uses the luminance index value 142 to select the EL cathode bias voltage ELVSS 212 from a second pre-set LUT of EL cathode bias voltages.

In this manner, as described in more detail below and in one potential advantage of the present disclosure, by utilizing the dynamically determined luminance index value 142 of each sampled portion of HDR data, which corresponds to the maximum luminance level of such sampled portion, configurations of the present disclosure control these voltage generators in a manner that dynamically adjusts the default maximum luminance capability of the OLED device to a runtime maximum luminance capability that is lower than the default maximum luminance capability. Accordingly, power consumption at each OLED node is significantly reduced.

With reference now to FIG. 5, the power management IC 210 receives the luminance index value 142 from the HDR pixel data to display pixel data decoder/convertor 134, and the pixel DAC reference voltage generator 202 and EL cathode bias voltage generator 206 use the luminance index value to generate voltages as described above. The power management IC 210 is connected to ground 216 and receives voltage VCC 220 from a power source. In different examples the power management IC 210 may use a plurality of different power source levels in order to optimize DC/DC efficiency. The power management IC outputs EL cathode bias voltages ELVSS 212 (from EL cathode bias voltage generator 206) and ELVDD 224 voltages to the OLED nodes in OLED array 180. The power management IC 210 also outputs unselected voltage levels 228 and selected voltage levels 230 to the row PWM drivers 190, and delivers the pixel DAC reference voltages Vref 208 to the column drivers 198. The power management IC 210 provides logic power 234 and ground 236 to the column drivers 198. The power management IC 210 also outputs unselected voltage levels 240 and selected voltage levels 242 to the row sample selectors 178.

Figure 6:
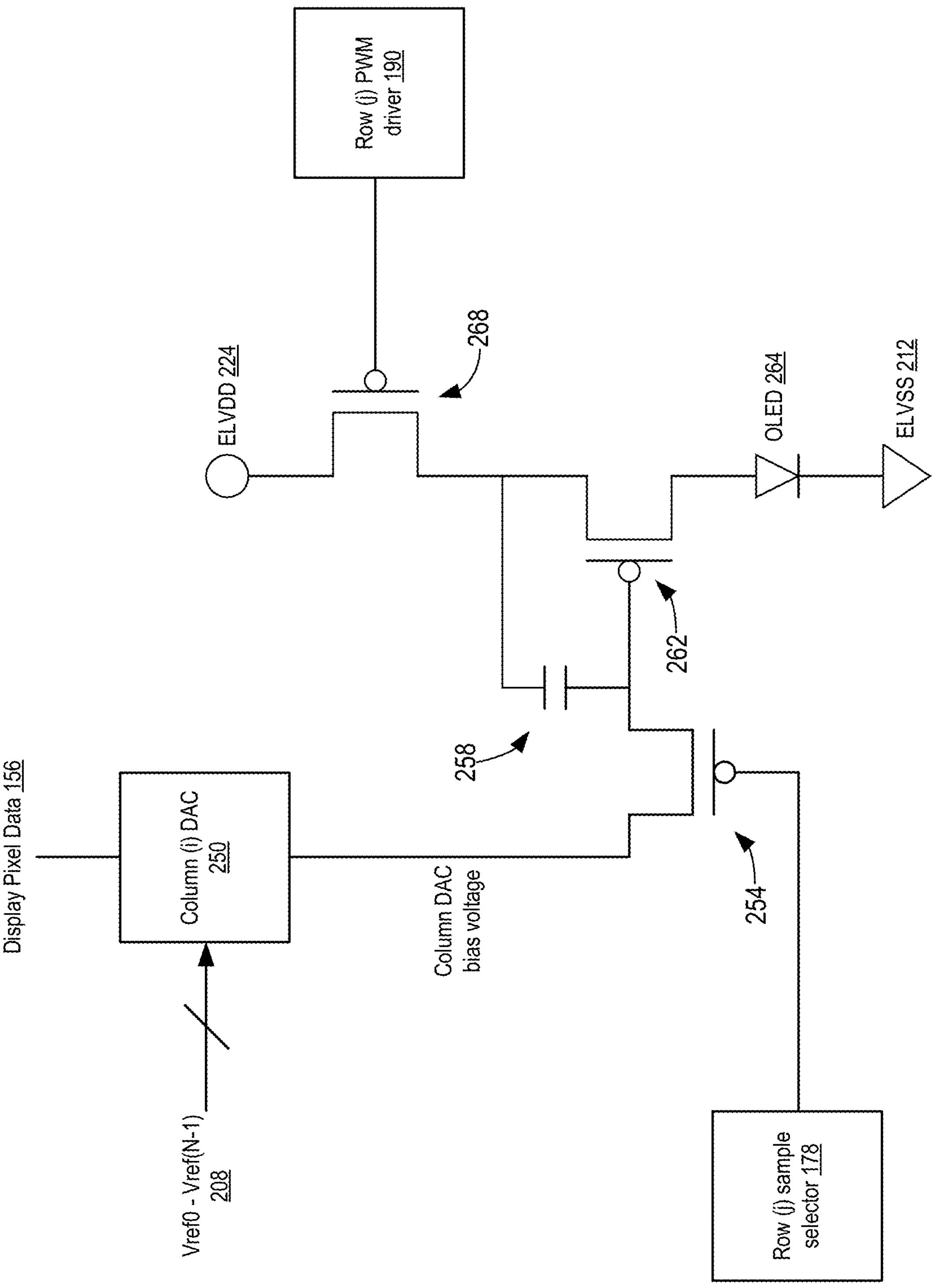
FIG. 6 shows a schematic diagram of an example circuit for an OLED pixel structure that can be utilized by OLED display systems according to examples of the present disclosure.

With reference now to FIG. 6, an exemplary circuit of one OLED node of the OLED array 180 is illustrated. It will be appreciated that the circuit of FIG. 6 is one example of a circuit that can implement aspects of the present disclosure, and that many other variations are possible. For example, while the circuit of FIG. 6 utilizes three transistors, other configurations of the present disclosure can utilize circuits having four or more transistors and/or other components.

In this example, a column (i) DAC 250 of the column drivers 198 receives display pixel data 156 corresponding to OLED pixel (i, j) and pixel DAC reference voltages Vref 208 from pixel DAC reference voltage generator 202. The column (i) DAC 250 uses the pixel DAC reference voltages Vref 208 to generate a column (i) DAC bias voltage for driving a level sample transistor 254. When row (j) line is selected by row (j) sample selector 178, the level sample transistor 254 becomes conductive and the column (i) DAC bias voltage is held by a level hold capacitor 258. When row (j) line is unselected, the level sample transistor 254 becomes non-conductive and the column DAC bias voltage is retained until the next sample and column DAC bias voltage are received.

With continued reference to FIG. 6, in this example the column DAC bias voltage determines the impedance of the drive transistor 262. As described above, the EL cathode bias voltage ELVSS 212 is generated by the EL cathode bias voltage generator 206 for the cathode side of the OLED 264. Driving current to OLED 264 is induced accordingly from ELVDD 224 to ELVSS 212 to cause OLED emission. In this example, row (j) PWM driver 190 controls a PWM switching transistor 268 to modulate the induced current and enable finer variations of illumination of OLED 264.

In one potential advantage of the present disclosure, by utilizing a pixel DAC reference voltage Vref 208 and EL cathode bias voltage ELVSS 212 that are dynamically-determined for a given sampled portion of the HDR pixel data, a column (i) DAC bias voltage is generated for driving the level sample transistor 254 and drive transistor 262 in a manner that dynamically controls the luminance capability of the OLED based on an actual maximum content luminance required for the sampled portion of HDR pixel data. In the example circuit of FIG. 6 and as noted above, the impedance of the drive transistor 262 is determined by this column (i) DAC bias voltage, and thereby is utilized to dynamically reduce power dissipated by the parasitic circuit as described further below. In this manner, for each sampled portion of the HDR pixel data, the EL cathode bias voltage ELVSS 212 is closer to ELVDD 224 voltage, thereby reducing the voltage drop across the drive transistor 262 and correspondingly reducing power dissipated by the parasitic circuit, as compared to utilizing a default maximum luminance capability that is equal to or approaching the actual maximum luminance capability of the OLED display system. Accordingly, power consumption at each OLED node is significantly reduced as compared to systems that utilize a static default maximum luminance.

For example, in one prophetic example of a use-case scenario, the OLED node of FIG. 6 has a default maximum luminance capability of 1000 nits. A sampled portion of the HDR pixel data requires a peak luminance of just 200 nits. By determining a luminance index value 142 of the sampled portion of HDR pixel data that corresponds to the actual peak luminance of 200 nits, the OLED display system utilizes the luminance index value to control the pixel DAC reference voltage generator 202 and the EL cathode bias voltage generator 206 in a manner that dynamically adjusts the default maximum luminance capability to a runtime maximum luminance capability of approximately 200 nits. Accordingly, the voltage drop across the drive transistor 262 and corresponding parasitic circuit power consumption are significantly reduced as compared to utilizing voltages to maintain the default maximum luminance capability of 1000 nits.

In this manner, each OLED node of the OLED array 180 utilizes pixel DAC reference voltages Vref 208 and EL cathode bias voltages ELVSS 212 that correspond to luminance index values to continuously and dynamically adjust a default maximum luminance capability to a runtime maximum luminance capability for each sampling window of HDR pixel data.

Figure 7A:
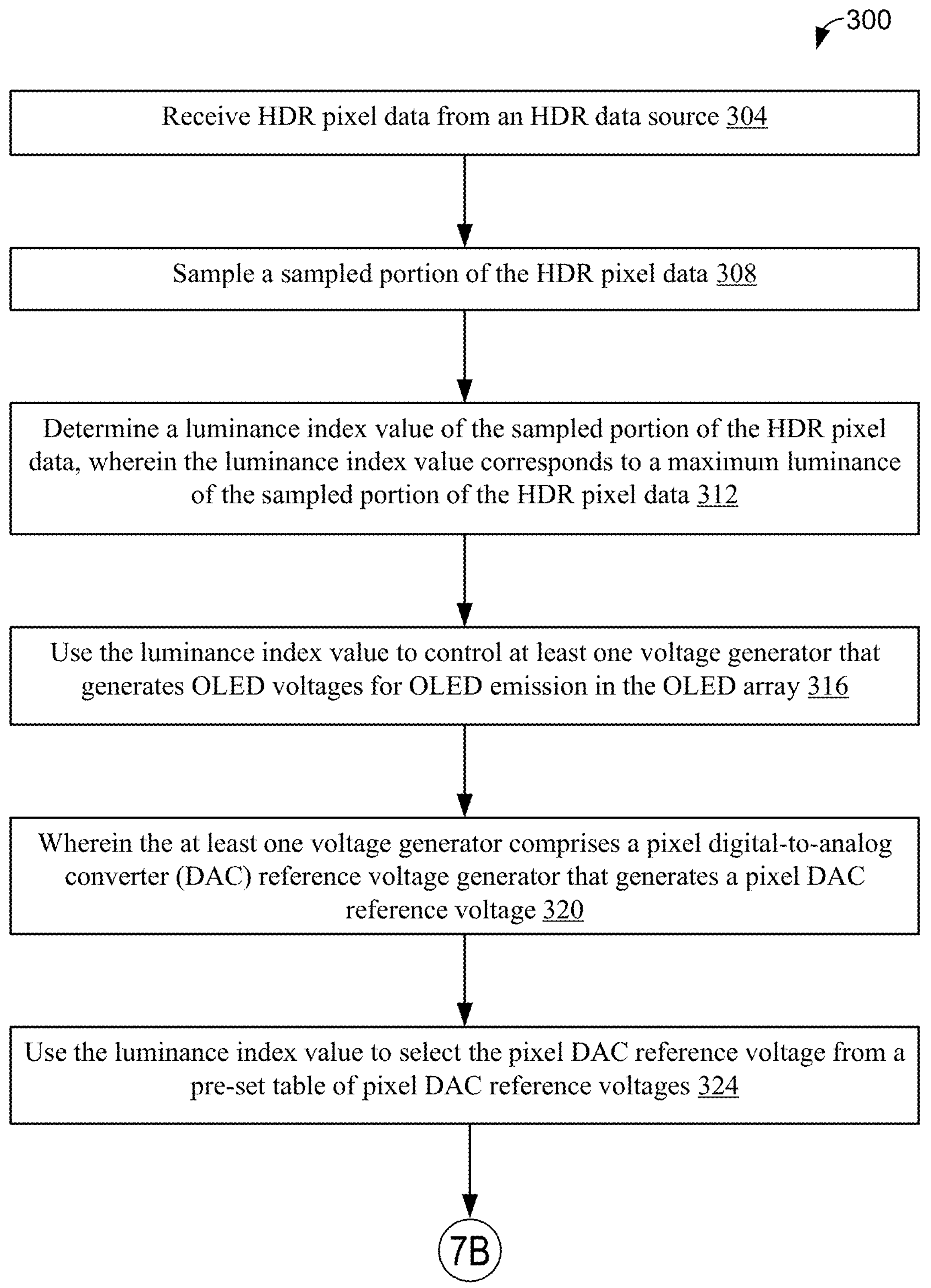
FIGS. 7A-7B show a block diagram of an example method for reducing power consumption of the OLED display system according to examples of the present disclosure.
Figure 7B:
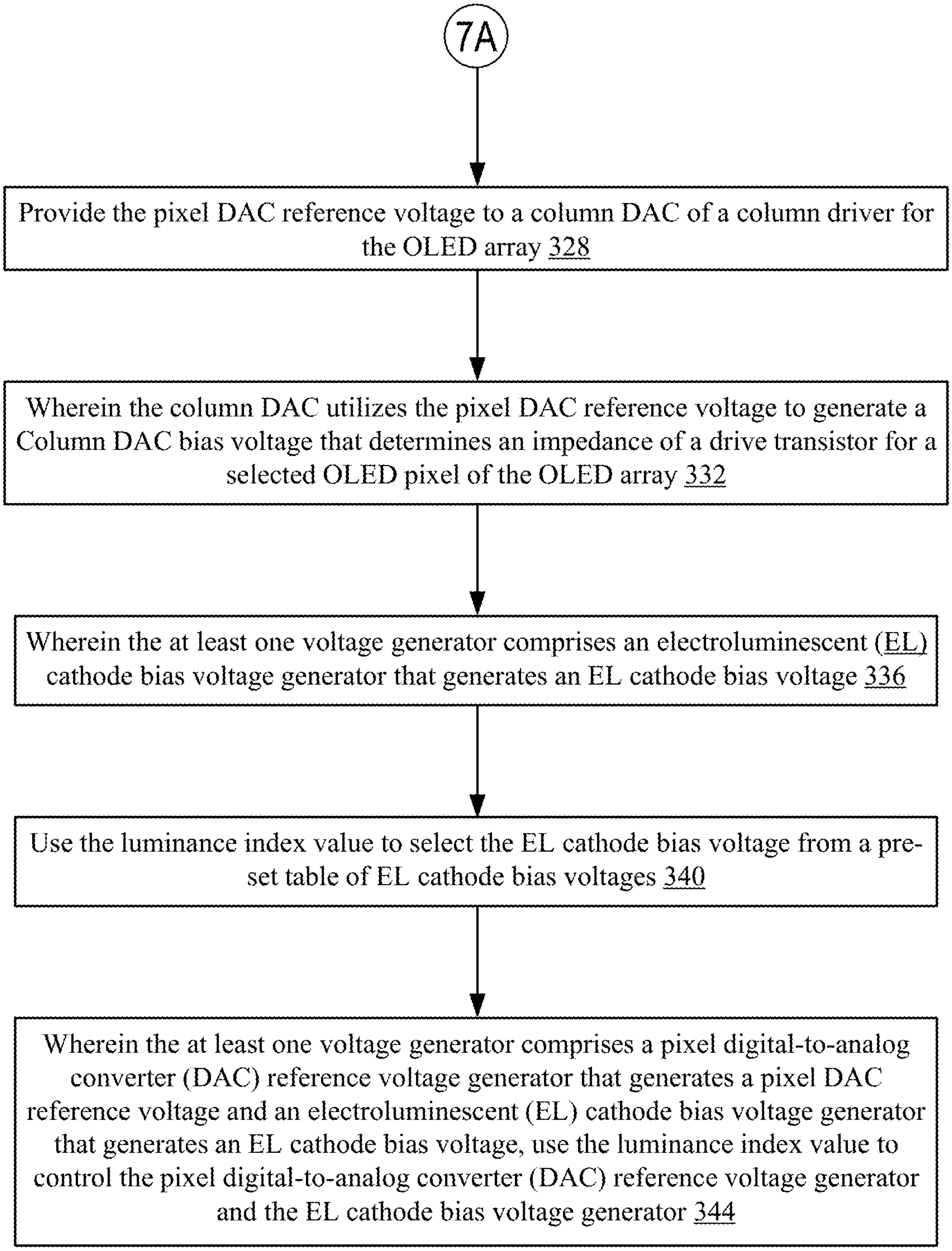

With reference now to FIGS. 7A-7B, a flow diagram is provided depicting an example method 300 for reducing power consumption of an OLED display system configured to reproduce HDR video via an OLED array. The following description of method 300 is provided with reference to the systems, computing devices, and components described herein and shown in FIGS. 1-6 and 8. In some examples, the method 300 is performed at the computing device 100 of FIG. 1. In other examples, the method 300 is performed in other contexts using other suitable components.

At 304 of FIG. 7A, the method 300 includes receiving HDR pixel data from an HDR data source. At 308 the method 300 includes sampling a sampled portion of the HDR pixel data. At 312 the method 300 includes determining a luminance index value of the sampled portion of the HDR pixel data, wherein the luminance index value corresponds to a maximum luminance of the sampled portion of the HDR pixel data. At 316 the method 300 includes using the luminance index value to control at least one voltage generator that generates OLED voltages for OLED emission in the OLED array. At 320 the method 300 includes wherein the at least one voltage generator comprises a pixel digital-to-analog converter (DAC) reference voltage generator that generates a pixel DAC reference voltage. At 324 the method 300 includes using the luminance index value to select the pixel DAC reference voltage from a pre-set table of pixel DAC reference voltages.

With reference now to FIG. 7B, at 328 the method 300 includes providing the pixel DAC reference voltage to a column DAC of a column driver for the OLED array. At 332 the method 300 includes wherein the column DAC utilizes the pixel DAC reference voltage to generate a Column DAC bias voltage that determines an impedance of a drive transistor for a selected OLED pixel of the OLED array. At 336 the method 300 includes wherein the at least one voltage generator comprises an electroluminescent (EL) cathode bias voltage generator that generates an EL cathode bias voltage. At 340 the method 300 includes using the luminance index value to select the EL cathode bias voltage from a pre-set table of EL cathode bias voltages. At 344 the method 300 includes wherein the at least one voltage generator comprises a pixel digital-to-analog converter (DAC) reference voltage generator that generates a pixel DAC reference voltage and an electroluminescent (EL) cathode bias voltage generator that generates an EL cathode bias voltage, the method comprising using the luminance index value to control the pixel digital-to-analog converter (DAC) reference voltage generator and the EL cathode bias voltage generator.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
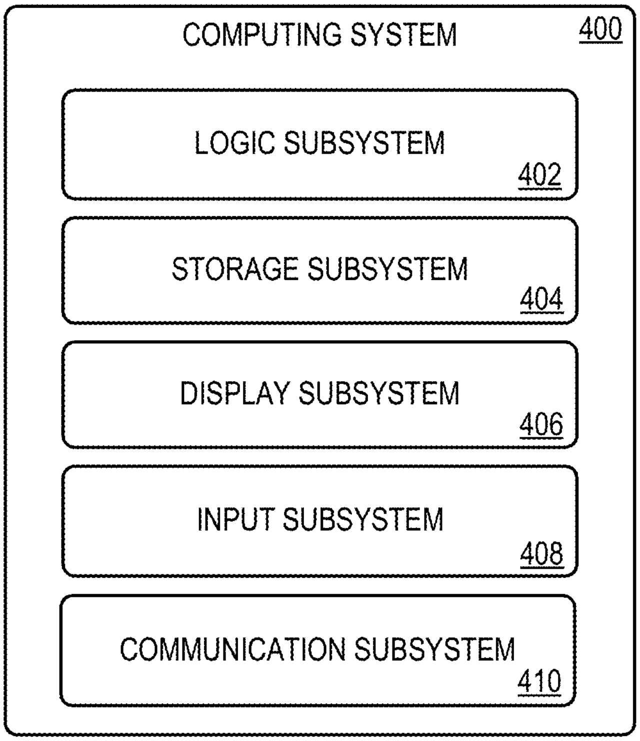
FIG. 8 shows a block diagram of an example computing system.

FIG. 8 schematically shows a non-limiting embodiment of a computing system 400 that can enact one or more of the examples described above. For example, computing system 400 can be used to execute instructions to perform the method 300 of FIGS. 7A-7B and/or potentially perform other functions.

Computing system 400 is shown in simplified form. Computing system 400 can take the form of one or more personal computers, server computers, tablet computers, network computing devices, mobile computing devices, mobile communication devices (e.g., smart phone), wearable computing devices, and/or other computing devices. In some examples, the computing device 100 of FIG. 1 comprises one or more aspects of the computing system 400.

Computing system 400 includes a logic subsystem 402, a storage subsystem 404, and a display subsystem 406. Computing system 400 can optionally include an input subsystem 408, a communication subsystem 410, and/or other components not shown in FIG. 8.

Logic subsystem 402 includes one or more physical devices configured to execute instructions. For example, logic subsystem 402 can be configured to execute instructions that are part of one or more applications, services, programs, routines, libraries, objects, components, data structures, or other logical constructs. Such instructions can be implemented to perform a task, implement a data type, transform the state of one or more components, achieve a technical effect, or otherwise arrive at a desired result. For example, logic subsystem 402 can be used to execute instructions to perform the method 300 of FIGS. 7A-7B.

Logic subsystem 402 can include one or more processors and/or microcontrollers configured to execute software instructions. Additionally or alternatively, logic subsystem 402 can include one or more hardware or firmware logic machines configured to execute hardware or firmware instructions. Processors and microcontrollers of logic subsystem 402 can be single-core or multi-core, and the instructions executed thereon can be configured for sequential, parallel, and/or distributed processing. Individual components of logic subsystem 402 optionally can be distributed among two or more separate devices, which can be remotely located and/or configured for coordinated processing. Aspects of logic subsystem 402 can be virtualized and executed by remotely accessible, networked computing devices configured in a cloud-computing configuration.

Storage subsystem 404 includes one or more physical devices configured to hold instructions executable by logic subsystem 402 to implement the methods and processes described herein. For example, storage subsystem 404 can hold instructions executable to perform the method 300 of FIGS. 7A-7B, and/or potentially perform other functions. When such methods and processes are implemented, the state of storage subsystem 404 can be transformed—e.g., to hold different data.

Storage subsystem 404 can include removable and/or built-in devices. Storage subsystem 404 can include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 404 can include volatile, nonvolatile, dynamic, static, read/write, read-only, random-access, sequential-access, location-addressable, file-addressable, and/or content-addressable devices.

It will be appreciated that storage subsystem 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 402 and storage subsystem 404 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), SoCs, and complex programmable logic devices (CPLDs), for example.

The terms “program” and “application” may be used to describe an aspect of computing system 400 implemented to perform a particular function. In some cases, a program or application may be instantiated via logic subsystem 402 executing instructions held by storage subsystem 404. It will be understood that different programs and applications may be instantiated from the same service, code block, object, library, routine, API, function, etc. Likewise, the same program or application may be instantiated by different services, code blocks, objects, routines, APIs, functions, etc. The terms “program” and “application” may encompass individual or groups of executable files, data files, libraries, drivers, scripts, database records, etc.

Display subsystem 406 can be used to present a visual representation of data held by storage subsystem 404. This visual representation can take the form of images, text, a graphical user interface (GUI), or other displayed content. As the herein described methods and processes change the data held by the storage subsystem 404, and thus transform the state of the storage machine, the state of display subsystem 406 can likewise be transformed to visually represent changes in the underlying data.

Display subsystem 406 can include one or more display devices utilizing virtually any type of technology. In some examples, display subsystem 406 comprises the OLED display system 104 described herein. Such display devices can be combined with logic subsystem 402 and/or storage subsystem 404 in a shared enclosure, or such display devices can be peripheral display devices.

When included, input subsystem 408 can comprise or interface with one or more user-input devices such as a keyboard, mouse, touch screen, or joystick. In some embodiments, the input subsystem 408 can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. For example, input subsystem 408 can be configured to receive user inputs while performing the method 300 and/or displaying content.

When included, communication subsystem 410 can be configured to communicatively couple computing system 400 with one or more other computing devices. Communication subsystem 410 can include wired and/or wireless communication devices compatible with one or more different communication protocols. As non-limiting examples, the communication subsystem can be configured for communication via a wireless telephone network, or a wired or wireless local- or wide-area network. In some embodiments, communication subsystem 410 can allow computing system 400 to send and/or receive messages to and/or from other devices via a network such as the Internet. For example, communication subsystem 410 can be used receive or send data to another computing system. As another example, communication subsystem may be used to communicate with other computing systems during execution of method 300 in a distributed computing environment.

The following paragraphs provide additional support for the claims of the subject application. One aspect provides an organic light emitting diode (OLED) display system configured to reproduce high dynamic range (HDR) video and reduce power consumption, the OLED display system comprising: an OLED array of OLED pixels; a power management system configured to provide power to the OLED pixels, the power management system comprising at least one voltage generator that generates OLED voltages for OLED emission in the OLED array; a timing microcontroller comprising a decoder/encoder configured to receive HDR pixel data and output display pixel data; and a memory storing instructions executable by the timing microcontroller to: sample a sampled portion of the HDR pixel data; determine a luminance index value of the sampled portion of the HDR pixel data, wherein the luminance index value corresponds to a maximum luminance of the sampled portion of the HDR pixel data; and use the luminance index value to control the at least one voltage generator. The OLED display system may additionally or alternatively include instructions executable to cause a luminance histogram analyzer of the decoder/encoder to (1) generate a luminance histogram of the sampled portion of the HDR pixel data and (2) determine the luminance index value from analyzing the luminance histogram. The OLED display system may additionally or alternatively include, wherein the at least one voltage generator comprises a pixel digital-to-analog converter (DAC) reference voltage generator, and the pixel DAC reference voltage generator uses the luminance index value to generate a pixel DAC reference voltage. The OLED display system may additionally or alternatively include instructions executable to use the luminance index value to select the pixel DAC reference voltage from a pre-set table of pixel DAC reference voltages. The OLED display system may additionally or alternatively include instructions executable to provide the pixel DAC reference voltage to a column DAC of a column driver for the OLED array. The OLED display system may additionally or alternatively include, wherein the column DAC utilizes the pixel DAC reference voltage to generate a Column DAC bias voltage, and the Column DAC bias voltage determines an impedance of a drive transistor for a selected OLED pixel of the OLED array. The OLED display system may additionally or alternatively include, wherein the at least one voltage generator comprises an electroluminescent (EL) cathode bias voltage generator that generates an EL cathode bias voltage. The OLED display system may additionally or alternatively include instructions executable to use the luminance index value to select the EL cathode bias voltage from a pre-set table of EL cathode bias voltages. The OLED display system may additionally or alternatively include providing the EL cathode bias voltage to a cathode of a selected OLED pixel of the OLED array. The OLED display system may additionally or alternatively include, wherein the at least one voltage generator comprises a pixel digital-to-analog converter (DAC) reference voltage generator that generates a pixel DAC reference voltage and an electroluminescent (EL) cathode bias voltage generator that generates an EL cathode bias voltage, and the instructions are executable to use the luminance index value to control the pixel digital-to-analog converter (DAC) reference voltage generator and the electroluminescent (EL) cathode bias voltage generator. The OLED display system may additionally or alternatively include instructions executable to sample the sampled portion of the HDR pixel data over a sampling window of between one frame and 240 frames of the HDR pixel data.

Another aspect provides, at an organic light emitting diode (OLED) display system configured to reproduce high dynamic range (HDR) video via an OLED array, a method for reducing power consumption of the OLED display system, the method comprising: receiving HDR pixel data from an HDR data source; sampling a sampled portion of the HDR pixel data; determining a luminance index value of the sampled portion of the HDR pixel data, wherein the luminance index value corresponds to a maximum luminance of the sampled portion of the HDR pixel data; and using the luminance index value to control at least one voltage generator that generates OLED voltages for OLED emission in the OLED array. The method may additionally or alternatively include, wherein the at least one voltage generator comprises a pixel digital-to-analog converter (DAC) reference voltage generator that generates a pixel DAC reference voltage. The method may additionally or alternatively include using the luminance index value to select the pixel DAC reference voltage from a pre-set table of pixel DAC reference voltages. The method may additionally or alternatively include providing the pixel DAC reference voltage to a column DAC of a column driver for the OLED array. The method may additionally or alternatively include, wherein the column DAC utilizes the pixel DAC reference voltage to generate a Column DAC bias voltage that determines an impedance of a drive transistor for a selected OLED pixel of the OLED array. The method may additionally or alternatively include, wherein the at least one voltage generator comprises an electroluminescent (EL) cathode bias voltage generator that generates an EL cathode bias voltage. The method may additionally or alternatively include using the luminance index value to select the EL cathode bias voltage from a pre-set table of EL cathode bias voltages. The method may additionally or alternatively include, wherein the at least one voltage generator comprises a pixel digital-to-analog converter (DAC) reference voltage generator that generates a pixel DAC reference voltage and an electroluminescent (EL) cathode bias voltage generator that generates an EL cathode bias voltage, the method comprising using the luminance index value to control the pixel digital-to-analog converter (DAC) reference voltage generator and the EL cathode bias voltage generator.

Another aspect provides a computing device comprising an organic light emitting diode (OLED) display system having a default maximum luminance capability, the OLED display system configured to reproduce high dynamic range (HDR) video, the OLED display system comprising: an OLED array of OLED pixels; a power management system configured to provide power to the OLED pixels, the power management system comprising at least one voltage generator that generates OLED voltages for OLED emission in the OLED array; a timing microcontroller comprising a decoder/encoder configured to receive HDR pixel data and output display pixel data; and a memory storing instructions executable by the timing microcontroller to: sample a sampled portion of the HDR pixel data; determine a luminance index value of the sampled portion of the HDR pixel data, wherein the luminance index value corresponds to a maximum luminance of the sampled portion of the HDR pixel data; and use the luminance index value to control the at least one voltage generator in a manner that dynamically adjusts the default maximum luminance capability to a runtime maximum luminance capability that is lower than the default maximum luminance capability.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An organic light emitting diode (OLED) display system configured to reproduce high dynamic range (HDR) video and reduce power consumption, the OLED display system comprising:

an OLED array of OLED pixels;

a power management system configured to provide power to the OLED pixels, the power management system comprising a plurality of voltage generators that generate OLED voltages for OLED emission in the OLED array;

a timing microcontroller comprising a decoder/encoder configured to receive HDR pixel data and output display pixel data; and a memory storing instructions executable by the timing microcontroller to, for each sampling rate of a plurality of sampling rates of HDR pixel data:

sample a sampled portion of the HDR pixel data;

determine a luminance index value of the sampled portion of the HDR pixel data, wherein the luminance index value corresponds to a maximum luminance of the sampled portion of the HDR pixel data; and use the luminance index value to control a portion of the plurality of voltage generators to generate different pixel DAC reference voltages for different OLED pixels in the OLED array to dynamically adjust a default maximum luminance capability of the OLED pixels to a runtime maximum luminance capability that is lower than the default maximum luminance capability.

2. The OLED display system of claim 1, wherein the instructions are executable to cause a luminance histogram analyzer of the decoder/encoder to (1) generate a luminance histogram of the sampled portion of the HDR pixel data and (2) determine the luminance index value from analyzing the luminance histogram.

3. The OLED display system of claim 1, wherein the instructions are executable to use the luminance index value to select the different pixel DAC reference voltages from a pre-set table of pixel DAC reference voltages.

4. The OLED display system of claim 1, wherein the instructions are executable to provide the pixel DAC reference voltages to column DACs of column drivers for the OLED array.

5. The OLED display system of claim 4, wherein the column DACs utilize the pixel DAC reference voltages to generate Column DAC bias voltages, and each of the Column DAC bias voltages determines an impedance of a drive transistor for a selected OLED pixel of the OLED array.

6. The OLED display system of claim 1, wherein the instructions are executable to use the luminance index value to control another portion of the plurality of voltage generators to generate different EL cathode bias voltages for different OLED pixels of the OLED array.

7. The OLED display system of claim 6, wherein the instructions are executable to use the luminance index value to select the different EL cathode bias voltages from a pre-set table of EL cathode bias voltages.

8. The OLED display system of claim 6, wherein the instructions are executable to provide the different EL cathode bias voltages to different cathodes of corresponding OLED pixels of the OLED array.

9. The OLED display system of claim 1, wherein the instructions are executable to sample the sampled portion of the HDR pixel data over a sampling rate of between one frame and 240 frames of the HDR pixel data.

10. At an organic light emitting diode (OLED) display system configured to reproduce high dynamic range (HDR) video via an OLED array, a method for reducing power consumption of the OLED display system, the method comprising:

receiving HDR pixel data from an HDR data source; and for each sampling rate of a plurality of sampling rates of the HDR pixel data:

sampling a sampled portion of the HDR pixel data;

determining a luminance index value of the sampled portion of the HDR pixel data, wherein the luminance index value corresponds to a maximum luminance of the sampled portion of the HDR pixel data; and using the luminance index value to control a plurality of voltage generators to generate different EL cathode bias voltages for different OLED pixels in the OLED array to dynamically adjust a default maximum luminance capability of the OLED pixels to a runtime maximum luminance capability that is lower than the default maximum luminance capability.

11. The method of claim 10, further comprising causing a luminance histogram analyzer of the decoder/encoder to (1) generate a luminance histogram of the sampled portion of the HDR pixel data and (2) determine the luminance index value from analyzing the luminance histogram.

12. The method of claim 10, further comprising using the luminance index value to select the different EL cathode bias voltages from a pre-set table of EL cathode bias voltages.

13. The method of claim 10, further comprising providing the different EL cathode bias voltages to different cathodes of corresponding OLED pixels of the OLED array.

14. The method of claim 10, further comprising using the luminance index value to control another plurality of voltage generators to generate different pixel DAC reference voltages for different OLED pixels of the OLED array.

15. The method of claim 14, further comprising providing the pixel DAC reference voltages to column DACs of column drivers for the OLED array.

16. The method of claim 15, wherein the column DACs utilize the pixel DAC reference voltages to generate Column DAC bias voltages, and each of the Column DAC bias voltages determines an impedance of a drive transistor for a selected OLED pixel of the OLED array.

17. The method of claim 14, further comprising using the luminance index value to select the different pixel DAC reference voltages from a pre-set table of pixel DAC reference voltages.

18. A computing device comprising an organic light emitting diode (OLED) display system having a default maximum luminance capability, the OLED display system configured to reproduce high dynamic range (HDR) video, the OLED display system comprising:

an OLED array of OLED pixels;

a power management system configured to provide power to the OLED pixels, the power management system comprising a plurality of voltage generators that generate OLED voltages for OLED emission in the OLED array;

a timing microcontroller comprising a decoder/encoder configured to receive HDR pixel data and output display pixel data; and a memory storing instructions executable by the timing microcontroller to, for each sampling rate of a plurality of sampling rates of the HDR pixel data:

sample a sampled portion of the HDR pixel data;

determine a luminance index value of the sampled portion of the HDR pixel data, wherein the luminance index value corresponds to a maximum luminance of the sampled portion of the HDR pixel data; and use the luminance index value to control a portion of the plurality of voltage generators to generate different pixel DAC reference voltages for different OLED pixels in the OLED array to dynamically adjust the default maximum luminance capability of the OLED pixels to a runtime maximum luminance capability that is lower than the default maximum luminance capability.

19. The computing device of claim 18, wherein the instructions are executable to provide the pixel DAC reference voltages to column DACs of column drivers for the OLED array.

20. The computing device of claim 18, wherein the instructions are executable to use the luminance index value to control another portion of the plurality of voltage generators to generate different EL cathode bias voltages for different OLED pixels of the OLED array.

* * * * *